US012700988B2

(12) United States Patent
D'souza

(10) Patent No.: US 12,700,988 B2
(45) Date of Patent: Aug. 4, 2026

(54) METHOD FOR ENCRYPTING DATA STREAMS

(71) Applicant: Richard D'souza, Langley (CA)

(72) Inventor: Richard D'souza, Langley (CA)

( * ) Notice: Subject to any disclaimer, the term of this patent is extended or adjusted under 35 U.S.C. 154(b) by 154 days.

(21) Appl. No.: 18/824,099

(22) Filed: Sep. 4, 2024

(65) Prior Publication Data

US 2026/0067060 A1      Mar. 5, 2026

(51) Int. Cl.
*H04L 9/00* (2022.01)
*H04L 9/30* (2006.01)

(52) U.S. Cl.
CPC ............ *H04L 9/007* (2013.01); *H04L 9/3066* (2013.01)

(58) Field of Classification Search
None
See application file for complete search history.

(56) References Cited

U.S. PATENT DOCUMENTS

| | | | | |
|---|---|---|---|---|
| 2002/0044649 A1* | 4/2002 | Gallant | .................... | G06F 7/725 |
| | | | | 708/492 |
| 2008/0040701 A1* | 2/2008 | Stern | ..................... | G06F 21/629 |
| | | | | 717/100 |
| 2012/0087491 A1* | 4/2012 | Joye | ......................... | H04L 9/302 |
| | | | | 380/28 |
| 2020/0372145 A1* | 11/2020 | Cramer | .................... | G06F 21/46 |
| 2021/0089040 A1* | 3/2021 | Ebrahimi Afrouzi | ......................... | |
| | | | | G05D 1/0248 |

| | | | | |
|---|---|---|---|---|
| 2023/0074843 A1* | 3/2023 | D'souza | ................ | H04L 9/0861 |
| 2023/0409755 A1* | 12/2023 | Wentz | ................... | G06F 21/645 |
| 2024/0396719 A1* | 11/2024 | D'souza | ................ | H04L 9/0852 |

OTHER PUBLICATIONS

Kumar, Manish, "Post-quantum Cryptography Algorithm's Standardization and Performance Analysis", In Array, vol. 15, Sep. 2022, 27 pages.
Dhanush, et al., "Comparison of Post-Quantum Cryptography Algorithms for Authentication in Quantum Key Distribution Classical Channel", In Second International Conference on Augmented Intelligence and Sustainable Systems (ICAISS), Aug. 2023, 4 pages.
Opilka, et al., "Performance Analysis of Post-Quantum Cryptography Algorithms for Digital Signature", In Applied Sciences 14(12), Jun. 2024, 15 pages.
Mehic, et al., "Quantum Key Distribution Networks—A Quality of Service Perspective", In Springer, Sep. 2022, 232 pages.

(Continued)

*Primary Examiner* — William J. Goodchild

(57) ABSTRACT

The present disclosure relates to a method for encrypting a data stream. The method comprises encoding the data stream into one or more torus knots and generating a public key and a private key. The public key is generated from the geometric properties associated with the one or more torus knots and the private key comprises a unique decoding threshold and a unique identifier associated with a specific user or a session. The method further comprises combining the public key and the private key to generate a session key and generating one or more noise knots. Moreover, each noise knot is randomly generated and interspersed with the torus knots. The method also comprises employing a shuffling process to reorder the torus knots and the noise knots based on the session key to encrypt the data stream to generate an encrypted data stream.

17 Claims, 7 Drawing Sheets

(56)          References Cited

OTHER PUBLICATIONS

Lella, et al., "Cryptography in the Quantum Era", In IEEE 15th Workshop on Low Temperature Electronics (WOLTE), Jun. 2022, 4 pages.
Chen, et al., "Report on Post-Quantum Cryptography", In NISTIR 8105, Apr. 2016, 15 pages.
Alagic, et al., "Status Report on the Second Round of the NIST Post-Quantum Cryptography Standardization Process", In NISTIR 8309, Jul. 2020, 39 pages.
Johansson, et al., "Post-Quantum Cryptography", In 14th International Workshop, PQCrypto, Aug. 2023, 715 pages.

* cited by examiner

100

300

PARAMETERS R, r, p, q
302

VALIDATE R, r ARE POSITIVE AND p, q ARE COPRIME
304

CALCULATE t = np.linspace (0, 2 * π, num_points)
306

CALCULATE X = (R + r * cos(q * t)) * cos (p * t),
Y = (R + r * cos(q * t)) * sin (p * t),
Z = r * sin(q * t)
308

PLOT TORUS KNOTS USING X, Y, Z
310

400

700

Encoded bit: 0

Encoded bit: 1

Noise

METHOD FOR ENCRYPTING DATA STREAMS

TECHNICAL FIELD

Generally, the present disclosure relates to data encryption methods. Particularly, the present disclosure relates to a method for encrypting data streams based on torus knots.

BACKGROUND

The description in the background section includes general information related to the field of the present application. The background is only meant to provide context to a reader in understanding the present invention. It is neither to be taken as an admission that any of the provided information relates to prior art for the presently claimed invention nor that any publication explicitly or implicitly referenced within this section relates to prior art. The background section is merely meant to be illustrative rather than exhaustive and is primarily intended to identify problems associated with the present state of the art.

Generally, requirement for information security has grown increasingly and driven by the expansion of digital communications and the corresponding need to protect sensitive data. The safeguarding of information is vital across various domains, including finance, healthcare, sports, education and personal privacy. As digital communications proliferate, so do the threats posed by malicious cyber attacker seeking to compromise the confidentiality, integrity, and availability of data. The protection of data against unauthorized access, tampering, and disruption is essential to maintaining trust in digital systems and ensuring the continuity of operations in critical sectors. To address security concerns, information security technologies have been developed and widely adopted for safeguarding data. Encryption techniques manage sensitive information, ensuring access only to authorized parties. The encryption techniques rely on complex algorithms to secure data both at rest and during transmission. Additionally, information security employs security protocols to create secure communication channels, protecting data from interception and unauthorized access during transfer across networks.

Moreover, information security strengthens access control by utilizing authentication mechanisms, including multifactor verification and biometric systems, preventing unauthorized entities from gaining entry to sensitive information systems. These technologies form the backbone of modern data security, providing multiple layers of defense against potential threats. However, these technologies are not without limitations.

Encryption techniques, while effective, depend on the assumption that the algorithms used are computationally difficult to break. Further, the risk of these encryption methods becoming vulnerable grows as computing power increases, particularly with the rise of more advanced systems. Although robust, information security protocols can be undermined by sophisticated attacks that exploit vulnerabilities in their implementation or configuration.

Further, authentication systems, despite adding extra layers of security, can still be compromised through methods such as phishing, spoofing, or social engineering. Additionally, maintaining and updating security measures requires significant resources and continuous vigilance, which may challenge some organizations over time. Moreover, the emergence of quantum computing presents a significant challenge to existing information security measures. Quantum computing performs complex calculations at unprecedented speeds, posing a direct threat to traditional cryptographic algorithms. These advanced computing capabilities could break encryption methods considered secure today, rendering these methods ineffective against quantum attacks. This vulnerability urges need to develop cryptographic methods that withstand classical and quantum computational threats.

In light of the above discussion, there exists an urgent need for solutions that overcome the problems associated with conventional systems and techniques for ensuring secure encryption, particularly in the face of emerging quantum computing capabilities.

SUMMARY

The following summary section provides only a brief introduction to the various embodiments of the present invention. It is to be understood that the following paragraphs are neither meant to constitute a complete and thorough description of the claimed subject matter nor is it intended to define the technical features or the scope of the claimed subject matter. Thus, the description in the summary section is neither intended to identify only the essential features of the present invention nor limit the scope of the claimed subject matter in any manner.

In an aspect, the present disclosure provides a method for encrypting a data stream. The method comprises encoding the data stream into one or more torus knots and generating a public key and a private key. The public key is generated from the geometric properties associated with the one or more torus knots. The private key comprises a unique decoding threshold and a unique identifier associated with a specific user or a session. The method further comprises combining the public key and the private key to generate a session key and generating one or more noise knots. Each noise knot is randomly generated and interspersed with the torus knots. Moreover, the method comprises employing a shuffling process to reorder the torus knots and the noise knots based on the session key to encrypt the data stream to generate an encrypted data stream. The method enables enhanced security during encryption by utilizing geometric properties for key generation and shuffling, thereby complicating unauthorized decryption attempts.

Further, the method comprises performing a decoding process for unshuffling the torus knots and the noise knots of the encrypted data stream to retrieve the data stream, using the private key. The method enables decryption of the encrypted data stream while maintaining the integrity of the original data stream.

Moreover, the specific geometric parameters associated with the plurality of torus knots comprise a major radius (R) that defines a distance from a center of the torus to a circular path associated with the torus and two positive integers (p, q). Each of the positive integers (p, q) are coprime. The parameters enable precise encoding of the data stream into torus knots, contributing to the robustness of the encryption process.

In addition, the method determines resolution of each torus knot by a number of points which represent the knot. This determination enhances the accuracy of the torus knot representation, thereby improving the fidelity of the encrypted data stream.

Furthermore, the positive integers p and q and the number of points are employed to create evenly spaced arrays to define the torus knot. This ensures consistent geometric configuration, facilitating uniform encryption standards.

Moreover, the method comprises computing a combination of rotations and translations for each point in the sequence based on the major radius (R), the minor radius (r) and the two coprime integers (p, q) to determine the three-dimensional coordinates for each point on the torus knot to define the geometric properties. Computation enables precise geometric definition, enhancing the security of the encryption method.

Further, the method comprises segmenting the received data stream into a sequence of initial bits, modifying the initial bits using a bitwise exclusive OR (XOR) operation with the session key to adjust the bits and encoding the adjusted bits into the torus knots. Segmentation and modification enable effective integration of the session key into the data stream, thereby strengthening the encryption process.

In another aspect, the method comprises generating a shuffle key by utilizing the session key and additional parameters. The shuffle key is generated for each encryption session. The method further comprises computing the shuffle indices from the shuffle key to reorder the torus knots to produce a shuffled arrangement of the torus knots to encrypt the data stream. Shuffling ensures randomness in the arrangement of torus knots, further complicating decryption without the correct key.

Moreover, the method comprises unshuffling the torus knots, using the session key, to an initial arrangement to facilitate decryption of the encrypted data stream. Unshuffling enables effective decryption by reversing the shuffling process, thereby restoring the original data stream.

Additionally, the unique decoding threshold is generated randomly. Random generation of the unique decoding threshold ensures that each private key has a distinct decoding capability, enhancing the security of the encryption method.

Moreover, the method comprises adjusting the density of points of each torus knot based on a perceived threat level or computational capability. Adjustment allows for dynamic response to different security requirements, optimizing the encryption strength accordingly.

Furthermore, the encoding process comprises employing a machine learning technique to optimize configuration of the torus knots based on at least one parameter selected from a nature of the data stream, a sensitivity level of the data stream, a data stream size, a historical data breach information and the network parameters. Optimization enables adaptive encryption strategies, improving resilience against emerging threats.

Additionally, the session key is valid only for a predefined time period. Temporal limitation enhances overall data protection by limiting available time for unauthorized decryption attempts.

Moreover, the unique identifier of the private key is associated with a biometric characteristic of the specific user. Biometric association of the unique identifier provides personalized security measures tailored to individual users.

Lastly, the geometric properties are updated periodically. Periodic updating ensures that the encryption method remains robust against evolving security challenges.

In another aspect, the present disclosure provides a non-transitory computer-readable storage medium comprising executable instructions that, when executed by a processing system including a processor, performs a method of encrypting a data stream by encoding the data stream into one or more torus knots and generating a public key and a private key. The public key is generated from the geometric properties associated with the one or more torus knots. The private key comprises a unique decoding threshold and a unique identifier associated with a specific user or a session. The method further comprises combining the public key and the private key to generate a session key and generating one or more noise knots. Each noise knot is randomly generated and interspersed with the torus knots. Moreover, the method comprises employing a shuffling process to reorder the torus knots and the noise knots based on the session key to encrypt the data stream to generate an encrypted data stream. Such a medium enables secure encryption of data streams through the described method, employing the advantages of torus knots and key-based shuffling.

The various objects, features, and advantages of the claimed invention will become clear when reading the following Detailed Description along with the Drawings.

BRIEF DESCRIPTION OF DRAWINGS

The following Brief Description of Drawings section will be better understood when read in conjunction with the appended drawings. Although exemplary embodiments of the present invention are illustrated in the drawings, the embodiments are not limited to the specific features shown in the drawings. The drawings illustrate simplified views of the claimed invention and are therefore not made to scale. Identical numbers in the drawings indicate like elements in the drawings.

The embodiments of the present invention will now be briefly described by way of example only with reference to the drawings in which.

DETAILED DESCRIPTION OF DRAWINGS

The following is a detailed description of exemplary embodiments to illustrate the principles of the invention. The embodiments are provided to illustrate aspects of the invention, but the invention is not limited to any single embodiment. The scope of the invention encompasses without limitation numerous alternatives, modifications and combinations.

It shall be noted that as used within the current section as well as in the appended claims, the singular forms "a", "an", and "the" include plural referents unless the context clearly dictates otherwise. Further, the use of words such as "first", "second", "third" and the like does not represent any particular order. These words have been merely employed to distinguish one individual component from another. Moreover, "each" refers to each member of a set or each member of a subset of a set.

An arrangement of two or more components, unless stated specifically, can be done without limitation in any manner relative to a three-dimensional coordinate system. Thus, a second component arranged underneath a first component may also be taken to mean that the first component is arranged underneath the second component.

The phrase "configured to" as used through the Detailed Description as well as the appended Claims is to be taken to mean that the particular component that is configured to perform a specific action is specially conceived, designed and subsequently manufactured to enable the particular component to be employed for conveniently performing the specific action. However, this should not be taken to mean that the particular component is only capable of performing one specific action that the particular component is configured to do. It may perform a variety of different actions in addition to the specific action that the particular component has been configured to do.

The phrase "operably coupled" as used throughout the Detailed Description as well as the appended Claims is to be understood to refer to a coupling between two or more components that such an action performed by or on a first of the components is transferrable as an equivalent action of or on a second of the component that is operably coupled to the first component. It will be appreciated if more than two components can be operably coupled to each other.

It will also be appreciated that modifications, additions, or omissions may be made to the systems and apparatuses described hereinafter without departing from the scope of the Claims. The components of the systems and apparatuses may be integrated or separated. Moreover, the operations of the systems and apparatuses may be performed by more, fewer, or other components.

Figure 1:
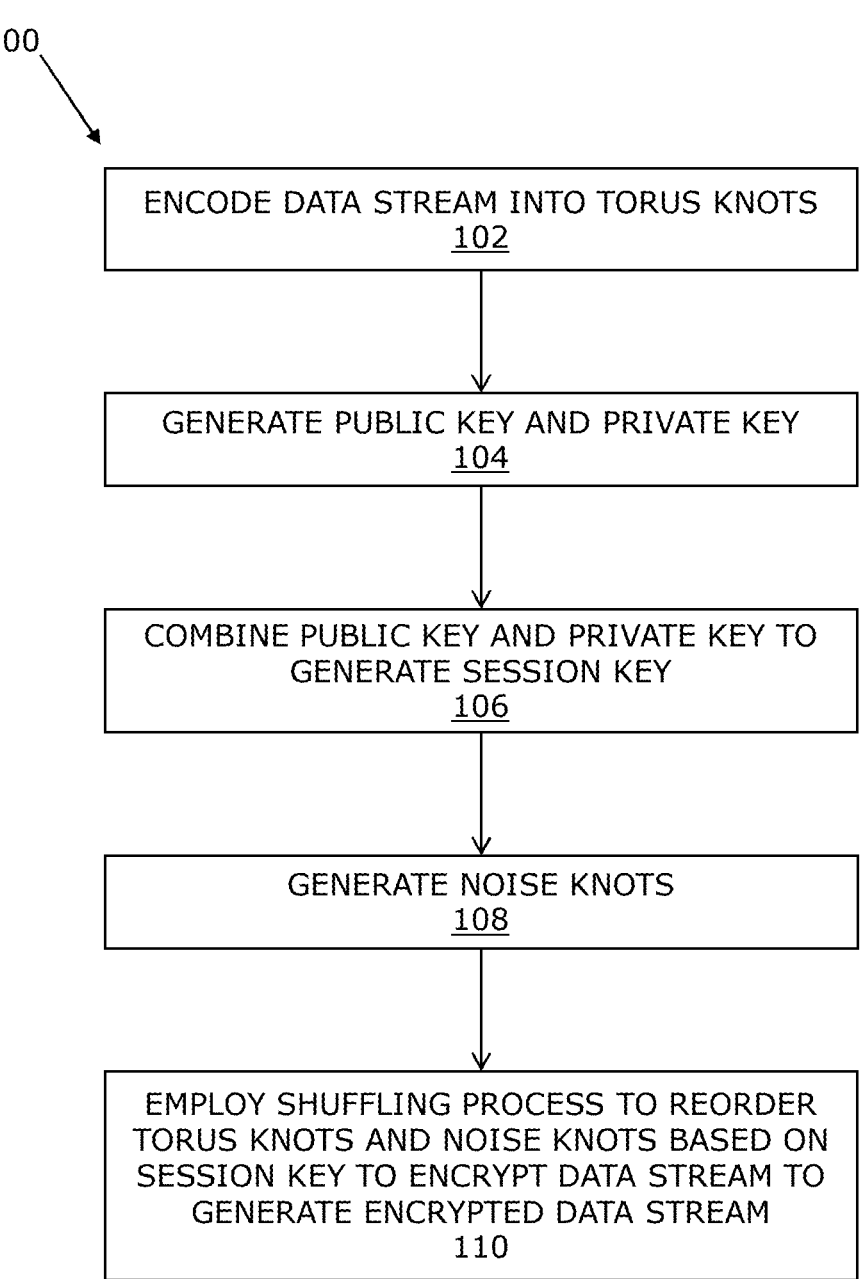
FIG. 1 shows a flowchart of a method for encrypting a data stream, in accordance with an embodiment of the present disclosure.

Referring to FIG. 1, flowchart 100 shows a method for encrypting a data stream, in accordance with an embodiment of the present disclosure. The term "data stream" relates to a continuous flow of binary data subject to encryption using the disclosed method. The method relates to a series of steps executed for encrypting a data stream. The data stream can comprise various types of digital information, for instance, text, audio, video, or sensor data, which is transmitted from one point to another. As used herein, the term "encrypting" refers to the process of converting data into a secure format that is not easily readable or accessible without proper authorization. Encryption involves applying specific technique to the data to protect from unauthorized access or tampering. Encryption process is commonly used to safeguard sensitive information during storage or transmission. Encryption comprises encoding a data stream into a complex geometric structure, generating cryptographic keys and applying additional security measures. The data stream can also be applicable to other forms of real-time data transmission, such as live audio broadcasts, sensor data from IoT devices, or continuous log files from a server.

At step 102, the method comprises encoding the data stream into one or more torus knots. The term "torus knots" relates to a type of three-dimensional geometric structure characterized by a closed loop winding around a torus in a complex pattern. The torus knot is defined by two integers p and q that determine the number of times the loop winds around the central axis and the tube of the torus, respectively. The torus knots enable encoding of binary data into complex geometric torus knots to enhance security against classical and quantum computational attacks. The encoding process translates the sequence of data into geometrical torus knots, which enable encryption and transformation of received data stream in a form that is compatible with the encryption method described, allowing for secure transmission and storage. Consequently, the torus knots are intricate three-dimensional geometric structures uniquely suited for securing binary information due to the complex topology. Further, converting the data stream into torus knots ensures that the encoded data embeds within a structure resistant to classical and quantum computational attacks. The encoding process begins by breaking the data stream into smaller segments, wherein each segment maps to a torus knot configuration based on predefined rules. The process of generating torus knots from smaller segments of a data stream involves mapping specific data segments to the geometric properties of torus knots. Further, mapping relies on predefined criteria to determine how each segment influences the shape and configuration of torus knots. One exemplary criterion for torus knot generation could be the length of each data segment. Additionally, segment of binary data might divide into groups of bits, where each group represents a distinct aspect (e.g., geometry) of torus knot. The number of bits in a segment can be correlated to the number of twists or loops in such a knot. For instance, a binary segment of 8 bits might correspond to a torus knot with 8 twists around the toroidal surface. Another criterion might involve specific bit patterns within a segment. Specific bit sequences could correspond to particular geometric features (major radius, minor radius and position of torus knot). Another criterion could involve specific mathematical functions to translate data segments into knot parameters. For instance, the sum of values within a data segment could determine the overall scale of torus knot. Alternatively, the product of values in segment could influence a knot's complexity, such as the number of crossings or the intricacy of the path. Optionally, nature data stream or the intended security level can be used to control torus knot generation. For highly sensitive data, criteria might require more complex knots with additional geometric features, ensuring greater difficulty in decryption. Conversely, for less sensitive data, simpler criteria might generate knots with fewer twists and a more straightforward structure, balancing security with computational efficiency.

At step 104, the method generates a public key and a private key. The method generates the public key from the geometric properties associated with one or more torus knots. The term "public key" relates to a cryptographic key generated from the geometric properties of one or more torus knots. The public key is used with a private key to enable secure encryption and decryption of data. Further, the uniqueness and security of the public key are associated with the specific geometric configuration of the torus knots. The aforesaid properties such as the major radius and coprime integers defining the knot ensure the public key is unique and secure and correspond directly to the encoded torus knots. The private key comprises a unique decoding threshold and a unique identifier associated with a specific user or session. The term "private key" relates to a cryptographic key that decrypts data encrypted using the corresponding public key. Further, the unique decoding threshold aids in accurate decoding of the torus knots back into the original data. The unique identifier ties the encryption process to the specific user or session, providing a personalized level of security. The generation of the public and private keys can be based on geometric properties of the torus knots derived from the encoded data stream. For example, the winding number of the torus knot is calculated, determining how often the knot wraps around the torus both longitudinally and meridionally. Further, the major and minor radii of the torus are also computed. The aforesaid geometric properties, including the winding number and radii, are then encoded into a numerical form to create the public key, which may involve concatenating these values. The private key generation comprising utilization of a unique decoding threshold, possibly related to the knot's geometric complexity, and a unique identifier linked to a user or session, often generated through hashing biometric data or a random session identifier. The unique identifier and torus knot geometric elements are combined using cryptographic operations to enable that private key is secure and unique. Finally, the public and private keys undergo testing to verify their compatibility, ensuring that data encrypted with the public key can be correctly decrypted with the private key. This process ensures the secure and precise generation of the key pair, customized to the geometric features of the torus knots.

At step 106, the method combines the public key and the private key to generate a session key. The term "session key" relates to a cryptographic key generated by combining a public key and a private key. The session key plays a central role in the encryption and decryption processes. The session key is a temporary key used for a single encryption or decryption session, which enhances the security of the data stream by ensuring that even if one key is compromised, the data remains secure without access to the other key. As session key is a product of the unique elements of both the public and private keys, combination results in a key that is customized to the specific encryption process and session, thereby ensuring the secure handling of the data stream. The process of combining private and public keys involves operations such as bitwise XOR (exclusive OR) or concatenation, or other cryptographic functions. For example, if the public key is a series of numbers derived from the torus knot's geometric properties, and the private key includes a decoding threshold, the session key could be generated by performing an XOR operation on the numerical values of the public key and the threshold value in the private key. The resulting session key is unique to the session and is used to encrypt and decrypt data within that session. Additionally, the session key influences the ordering and shuffling of torus knots and noise knots during the encryption process. Consequently, the session key adds an additional layer of security to the encrypted data stream. Moreover, the session key guides the transformation of the torus knots and enhances the overall security of the encrypted data stream.

At step 108, the method generates one or more noise knots. Each noise knot is randomly generated and interspersed with the torus knots. The term "noise knots" relates to randomly generated torus knots interspersed with the actual data-encoding torus knots within an encrypted data stream. Noise knots are not associated with original data but are randomly generated to enhance the encryption process. Said noise knots are indistinguishable from the torus knots, which encode the actual data, enabling encrypted data more secure against unauthorized entities to differentiate between the real data and the noise. The inclusion of noise knots introduces an element of randomness into the encrypted data stream, further obfuscating the original information and increasing the complexity of the encryption, thereby enhancing the security of the data stream. Thus, the noise knots serve as decoys within the encrypted data stream. Further, the randomness of the noise knots significantly increases the challenge for unauthorized entities to decipher the true data structure, thereby increasing the resistance of the method to cryptanalytic attacks. The noise knots can be generated by selecting parameters (e.g., major radius, minor radius, and winding numbers), which define the geometric properties of the torus knot. For an exemplary instance, if torus knot is defined by a major radius of 5 units, a minor radius of 2 units, and winding numbers p=3 and q=5, the noise knot might use randomly chosen values like a major radius of 6 units, a minor radius of 3 units, and winding numbers p=4 and q=7. The randomness enables that noise knots are unrelated to the original data, thus enhancing encryption security. Random number generators, possibly seeded with time-based or hardware-based entropy sources, are employed to produce these values, making each noise knot unique and unpredictable.

At step 110, the method employs a shuffling process to reorder the torus knots, and the noise knots based on the session key. As used herein, the term "shuffling" refers to the process of reordering elements, such as data, information, or components, in a random or pseudo-random manner. Shuffling increases complexity, reduces predictability, enhances security by disrupting the natural or original order of the torus knots and the noise knots. The shuffling process encrypts the data stream to generate an encrypted data stream. Additionally, the shuffling process further obfuscates the relationship between the original data stream and its encrypted form. The reordering of knots based on the session key ensures that the encryption is unique to each session. Consequently, the method generates an encrypted data stream secure against unauthorized access. The session key acts as guide for determining the order in which the torus knots (representing actual data) and noise knots (randomly generated to add complexity) can be arranged randomly with deterministic order based on the session key. For example, if the data stream initially contains five torus knots and five noise knots, the session key might generate a sequence that scrambles order for obscuring the original sequence of the knots. The reordering enables encrypted data to become more difficult for unauthorized entities to identify which knots contain meaningful data and which are simply noise. After shuffling, the resultant data stream (i.e., encrypted data) can be transmitted over a secure channel or stored securely. Post-shuffling, additional steps may be undertaken to further secure the data. For instance, the entire shuffled data stream undergoes another layer of encryption using other known encryption techniques to augment overall security aspect.

Figure 2:
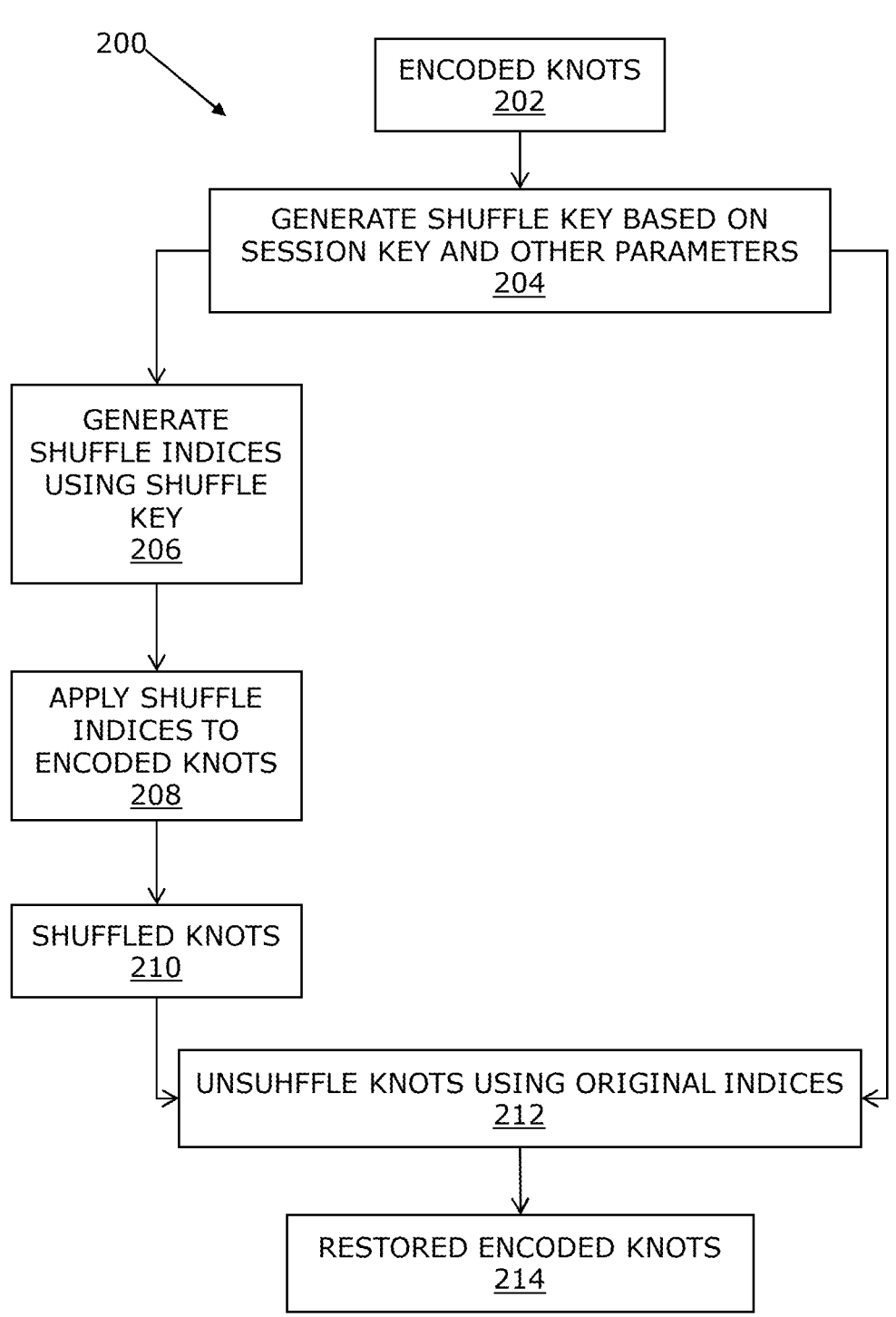
FIG. 2 shows a flowchart illustrating a decoding process for unshuffling the torus knots and the noise knots of the encrypted data stream to retrieve the data stream using the private key, in accordance with an embodiment of the present disclosure.

Referring now to FIG. 2, a flowchart 200 illustrates a decoding process for unshuffling the torus knots and the noise knots of the encoded data stream to retrieve the data stream using the private key, in accordance with an embodiment of the present disclosure. At step 202, the method receives the encoded torus knots.

At step 204, the method generates a shuffle key based on the session key and other parameters. The "other parameters" include the public key, the private key and the coprime integers p and q that define the geometric structure of the torus knots. The session key that is synthesized from the public and private keys plays a central role in the present step by providing the foundational cryptographic link that ties the encoded knots to the specific encryption session. Additionally, the public key and private key contribute to the shuffle key by ensuring the shuffle is unique to the session. The coprime integers p and q ensure the geometric integrity of the knots remains consistent during the shuffling and unshuffling processes. Subsequently, the process moves to either step 206 or step 212. The shuffle key denotes a specific order in which the torus knots are rearranged. Shuffle key can be unique to each encryption session to provide additional layer of security to the encryption process. The shuffle key is generated through cryptographic operations that combine the session key with additional parameters, for example, a timestamp and a random number. These operations might include hashing, XORing, or modular arithmetic. For example, the session key could be hashed together with a timestamp and a random number to create a unique shuffle key.

Further, when the process moves to step 206, the method generates shuffle indices using the shuffle key. The indices correspond to specific positions within the sequence of encoded knots. Additionally, the shuffle indices dictate how the knots will be reordered during the shuffling process. For instance, shuffle key can be associated with a pseudorandom number generator (PRNG), which produces a sequence of shuffle indices. At step 208, the method adds the shuffle indices to the encoded knots. The addition of the shuffle indices to the encoded knots changes their sequence to produce a shuffled arrangement of torus knots and noise knots. The shuffle indices can be used to reorder the torus knots in the data stream. This reordering or shuffling scrambles the data, enabling decoding difficult for anyone without the correct shuffle key to understand the sequence of knots. At step 210, the method obtains the shuffled knots. The shuffled knots represent an intermediate stage in the decoding process where the original data is obscured through the reordering of its geometric representation At step 212, the method unshuffles the shuffled knots using the original indices. The present step reverses the shuffling process, restoring the torus knots and noise knots to their original sequence. The unshuffling process relies on the original indices generated during the encryption phase, which are necessary for accurately reversing the shuffling and retrieving the correct order of knots. At step 214, the method restores the encoded knots. Restoration is critical to the final phase of the decoding process. The method decodes the torus knots that are correctly ordered back into the original binary data stream using the private key. To illustrate the shuffling and unshuffling process, consider a data stream encoded into a sequence of ten torus knots labelled "A" through "J". During encryption, shuffle key is used to determine a new order for the knots, resulting in a shuffled sequence like F, D, A, H, J, C, B, I, G, E. This shuffled arrangement becomes part of the encrypted data stream. When decrypting the data, the original sequence of knots ("A" through "J") needs to be restored using the same session key that was initially used to generate the shuffle key. The shuffle key is applied in reverse during the unshuffling process, which dictates how each knot should be returned to original position thereof. For instance, if during shuffling, knot F was moved to the first position, unshuffling would place F back in its original position within the sequence A through J. This process is repeated for each knot, reversing the shuffle until the knots are restored to their original order: A, B, C, D, E, F, G, H, I, J to derive data in original sequence.

Figure 3:
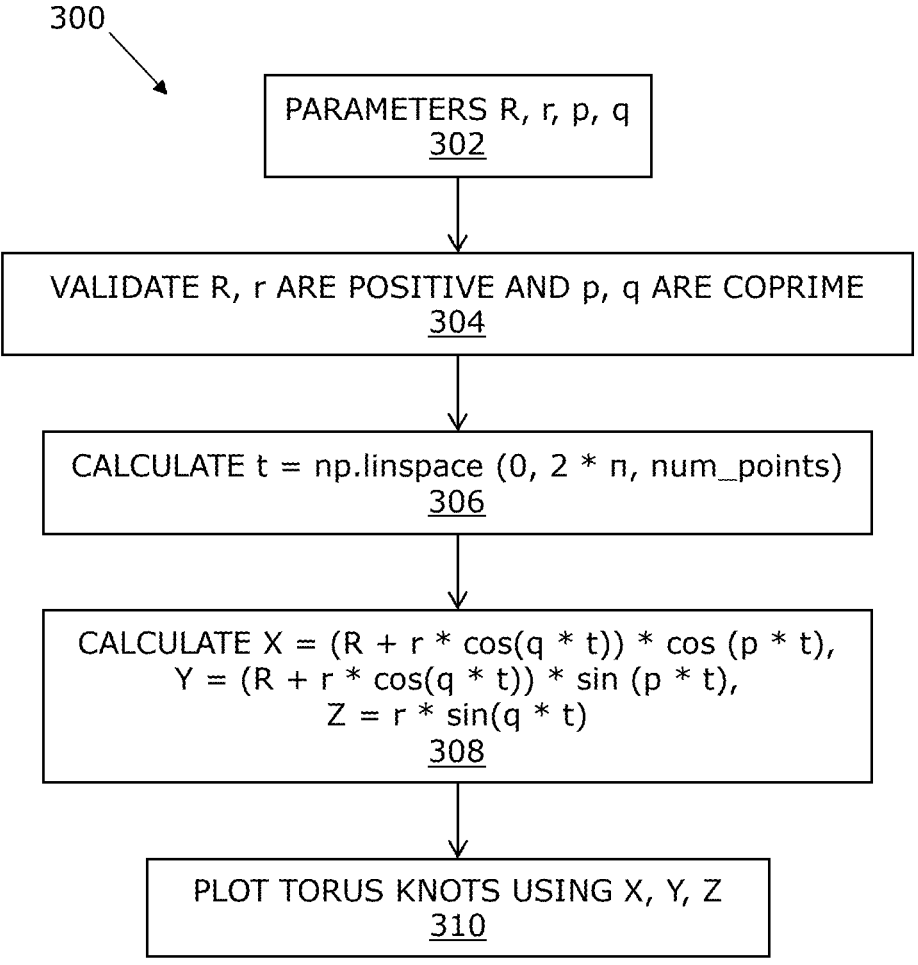
FIG. 3 shows a flowchart illustrating a method for employing specific geometric parameters for generating the plurality of torus knots, in accordance with an embodiment of the present disclosure.

Referring to FIG. 3, a flowchart 300 illustrates a method for employing specific geometric parameters for generating the plurality of torus knots, in accordance with an embodiment of the present disclosure. The specific geometric parameters comprise a major radius R that defines the distance from the center of the torus to a circular path associated with the torus and two positive integers p and q. Further, the positive integers p and q are coprime.

At step 302, the method receives the specific geometric parameters R, r, p and q. The major radius R defines the distance from the center of the torus to the circular path associated with the torus, thereby setting the overall size and spatial configuration of the torus knot. The integers p and q help in determining the winding pattern of the knot around the torus. The integers must be coprime, meaning they share no common divisors other than one. The coprimality of the integers ensures that the resulting torus knot forms a single, continuous loop without self-intersections, thereby maintaining the structural integrity required for secure data encoding.

At step 304, the method validates the parameters R and r to be positive and the parameters p and q to be coprime. Validation enables maintaining the physical feasibility of the structure of the torus knot and the correct formation of the torus knot. At step 306, the method calculates t as t=np.linspace (0, 2*n, num_points). The parameter t represents the angular coordinate that varies from 0 to n, thus effectively parametrizing the torus knot. The calculation of t defines the discrete points along the knot. Additionally, the calculation determines how the knot is traced out in three-dimensional space based on the number of points specified by num_points.

At step 308, the method calculates three dimensional coordinates X, Y and Z as X=(R+r*cos (q*t))*cos (p*t), Y=(R+r*cos(q*t))*sin (p*t) and Z=r*sin(q*t). The equations define the three-dimensional coordinates of each point on the torus knot, based on the previously validated parameters. The X, Y and Z coordinates are derived from the major radius R, the minor radius r and the coprime integers p and q. The parameter t controls the progression of the tracing of the knot, resulting in a torus knot that encapsulates the geometric complexity necessary for securely encoding binary data. The parameter t controls the position along the knot and determines how the knot wraps around the torus. As t varies, the X, Y, and Z coordinates are modified accordingly, thereby mapping out the full three-dimensional structure of the torus knot.

At step 310, the method plots the torus knot using the calculated X, Y and Z. The plotting process visualizes the torus knot in three-dimensional space, illustrating the final geometric form utilized within the encryption method. The plotted torus knot that is derived from the specific geometric parameters represents a secure structure for embedding and encrypting data. Additionally, the method utilizes the intricate spatial characteristics unique to torus knots. Consequently, the method ensures that the generated torus knots are mathematically robust and geometrically precise, providing the necessary complexity and uniqueness for secure data encryption. The resultant plot shows the torus knot as a continuous loop or series of loops that intersect and twist in a specific pattern, determined by the input parameters. The X, Y and Z points provide spatial characteristics of the torus knot, including the number of twists, the tightness of the loops, and the symmetry of the structure. The spatial configuration provides angles and intersections for embedding data securely within the structure. During plotting, checking for anomalies or irregularities can be executed to determine geometric form, such as unexpected overlaps or gaps, which could indicate errors in the calculation or encoding process. The verification step is vital for maintaining integrity of encryption. Once the plotting is complete, the visualized torus knot represents the final geometric form to be used in the encryption method.

In an embodiment, the method determines the resolution of each torus knot by the number of points representing the knot. As discussed in reference to FIG. 3, the parameter t that is calculated as t=np.linspace (0, 2*n, num_points) directly influences the resolution. The number of points specified by num_points dictate the granularity of the torus knot, with a higher number of points resulting in a finer and more detailed representation of the geometric structure of the torus knot. The resolution is vital for accurately capturing the intricate topology of the torus knot, which is relevant for the precise encoding of binary data. The parameter t defines the angular position along the circular path of the torus, where each value of t corresponds to a specific point on the torus knot. By generating multiple values of t, the method creates series of points to outline the path of the torus knot as it winds around the torus. For example, if num_points is set to a low value, such as 10, the np.linspace function will generate 10 values of t between 0 and 2π. 10 points will be spaced relatively far apart along the torus, resulting in a coarse and simplified representation of the knot. In case, if num_points is set to a higher value, such as 1000, np.linspace will generate 1000 evenly spaced values of t between 0 and 2π. With more points, the torus knot will have a much finer resolution, as there are more data points to represent the knot's path. This high resolution allows the knot to be depicted with much greater accuracy, with higher topology and smooth curves that define the geometric structure of torus knot.

In another embodiment, the method employs the positive integers p and q along with the number of points to create evenly spaced arrays that define the torus knot. As discussed in reference to FIG. 3, the coprime integers p and q determine the winding pattern of the torus knot around its major and minor radii. The parameter t that represents the angular progression is utilized in conjunction with p and q to compute the coordinates X, Y and Z in three-dimensional space. The number of points ensures that these arrays are evenly spaced, thereby defining the continuous loop of the torus knot with consistent geometric properties.

In yet another embodiment, the method comprises computing a combination of rotations and translations for each point in the sequence based on the major radius R, the minor radius r and the two coprime integers p and q to determine the three-dimensional coordinates for each point on the torus knot. As discussed in reference to FIG. 3, the spatial coordinates X, Y and Z are derived from equations that incorporate these geometric parameters. The combination of rotations and translations that are controlled by p, q, R and r ensures that each point on the torus knot is accurately positioned within its three-dimensional space, thereby fully defining the geometric properties of the knot for secure data encryption.

Figure 4:
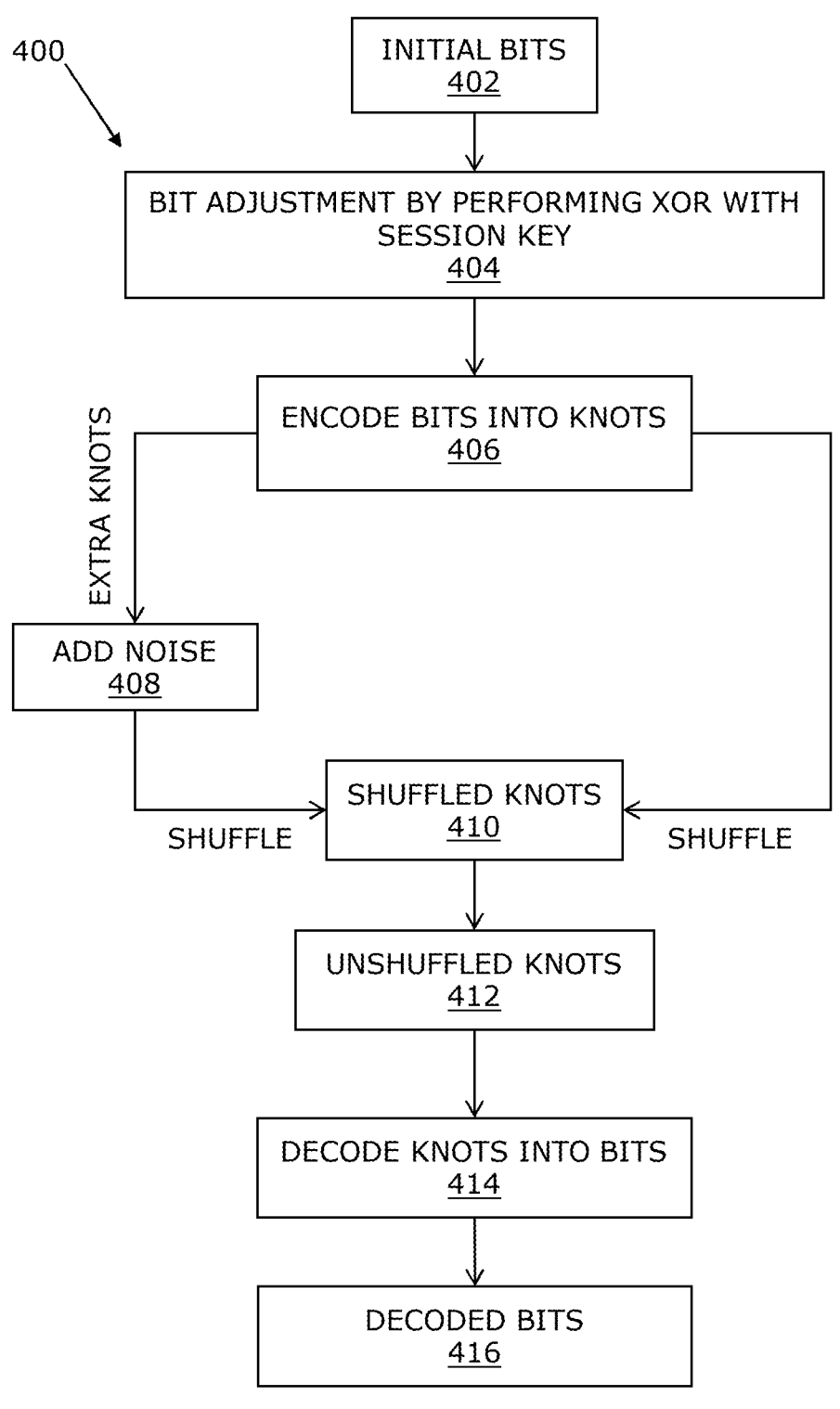
FIG. 4 shows a flowchart illustrating the encoding and subsequent decoding of the data stream, in accordance with an embodiment of the present disclosure.

Referring to FIG. 4, flowchart 400 illustrates the encoding and subsequent decoding of the data stream, in accordance with an embodiment of the present disclosure. The steps of chart 400 demonstrate that the data stream is securely encrypted and accurately decoded, maintaining the integrity and confidentiality of the information throughout the process. At step 402, the method segments the received data stream into a sequence of initial bits. Segmentation enables preparation of data for encryption, breaking down the continuous data stream into discrete units that can be individually processed during the encoding phase.

At step 404, the method modifies the initial bits using a bitwise exclusive OR (XOR) operation with the session key. The operation adjusts the bits by combining them with the session key, introducing an initial layer of encryption. The XOR operation serves to obscure the original data by altering the bit values in a manner determined by the session key.

At step 406, the method encodes the adjusted bits into torus knots. As discussed in reference to FIG. 3, the encoding step involves transforming the modified binary data into a three-dimensional geometric structure based on specific parameters, including the major radius R, the minor radius r and the integers p and q. The resulting torus knots provides secure medium for embedding the encoded data, utilizing the complex topology associated therewith to resist unauthorized access and computational attacks.

The process proceeds to either step 408 or step 410 for decoding the bits associated with the data stream from the encoded torus knots. At step 408, the method adds extra noise as noise knots. The noise knots are randomly generated and interspersed with the torus knots to further obfuscate the encoded data. The introduction of noise knots complicates the structure of the encrypted data, increasing its resistance to decryption attempts by unauthorized entities.

At step 410, the method comprises shuffling the torus knots to obtain shuffled knots. The shuffling adds an additional layer of security by disrupting the original order of the knots, making it more difficult for unauthorized parties to decode the encrypted data without access to the correct shuffling indices.

At step 412, the method comprises unshuffling the shuffled knots to obtain unshuffled knots. The unshuffling step reverses the shuffling process, restoring the knots to their original sequence using the indices generated during the encryption phase. The unshuffling process is critical for ensuring that the data can be accurately decoded in the subsequent steps.

At step 414, the method comprises decoding the unshuffled knots into bits. The decoding step involves reversing the geometric encoding process, translating the spatial coordinates of the torus knots back into the original binary data. The decoding process is guided by the geometric properties of the torus knots and the session key, ensuring the accurate retrieval of the original data stream.

At step 416, the method comprises retrieving the decoded bits. The original data stream is successfully retrieved from its encrypted form, having undergone a secure encoding and decoding process that leverages the complex topology of torus knots and additional cryptographic enhancements, such as addition of noise and shuffling, to protect against unauthorized access.

In an embodiment, the method comprises generating shuffle key by utilizing the session key and additional parameters. The shuffle key is generated for each encryption session. The method further comprises computing the shuffle indices from the shuffle key to reorder the torus knots, producing a shuffled arrangement of the torus knots to encrypt the data stream. As discussed in reference to FIG. 2, the shuffle key is generated for each encryption session, ensuring that each instance of encryption is uniquely tied to its session-specific parameters. The method further comprises computing the shuffle indices from the shuffle key to reorder the torus knots. Reordering process produces a shuffled arrangement of the torus knots, which is crucial for encrypting the data stream by disrupting the original sequence of the knots, thereby enhancing the security of the encryption against unauthorized decryption attempts.

In another embodiment, the method comprises unshuffling the torus knots using the session key to return the torus knots to an initial arrangement to facilitate the decryption of the encrypted data stream. As discussed in reference to FIG. 2 and FIG. 4, the unshuffling process is essential for facilitating the decryption of the encrypted data stream. The method enables to accurately reverse the shuffling of the torus knots by using the session key, ensuring that the knots are returned to their original sequence, which is necessary for correctly decoding the encrypted data back into its original binary form.

In yet another embodiment, the method comprises generating the unique decoding threshold randomly. The unique decoding threshold, as discussed in reference to FIG. 1, helps in determining the precise point at which the encoded torus knots can be accurately decoded back into the original data. The random generation of the decoding threshold enhances the security of the encryption process by introducing an element of unpredictability, making it more difficult for unauthorized parties to reverse-engineer the decryption process.

In still another embodiment, the method comprises adjusting the density of points of each torus knot based on a perceived threat level or computational capability. As discussed in reference to FIG. 3, the density of points that is determined by the parameter num_points affect the resolution and complexity of the torus knots. Further, adjusting the density allows the encryption process to respond dynamically to varying levels of threat or available computational resources. For example, increasing the density of points can enhance the security of the torus knots in environments with higher perceived threats, while reducing the density may be employed in situations where computational efficiency is important.

In an embodiment, the encoding process further comprises employing a machine learning technique to optimize the configuration of the torus knots based on at least one parameter selected from the nature of the data stream, the sensitivity level of the data stream, the data stream size, historical data breach information and network parameters. The machine learning technique analyzes the aforesaid parameters to dynamically adjust the configuration of the torus knots, thereby enhancing the encryption process by tailoring it to the specific characteristics of the data and its environment. The optimization allows robust and adaptive encryption, providing a higher level of security by responding to the unique requirements and vulnerabilities associated with the data stream. For an instance, if the data stream is large and transmitted over a network with known vulnerabilities, the machine learning technique can determine that requirement to use torus knots with higher winding numbers, higher value of num_points and more intricate patterns to make the encrypted data harder to decipher, if intercepted. Conversely, if the data is less sensitive or the network is highly secure, the machine learning technique can opt for a simpler knot configuration to balance security with processing efficiency. By customizing the torus knot configuration to the specific characteristics of the data and environment, the machine learning technique enhances encryption process and also enable adaptable approach. For instance, if historical data breach information suggests that certain types of data are more prone to attacks, the machine learning model adjusts the encryption, accordingly, applying a more complex knot structure to those data types.

In another embodiment, the session key is valid only for a predefined time period. Temporal limitation adds an additional layer of security by ensuring that the session key and the encryption are only applicable within a specific timeframe. Further, after the expiration of the predefined time period, the session key becomes invalid, necessitating the generation of a new session key for any further encryption or decryption processes. Time-based restriction mitigates the risk of prolonged exposure to threats, thereby enhancing the overall security of the encrypted data.

In yet another embodiment, the unique identifier of the private key is associated with a biometric characteristic (such as finger print, retina scan, voice etc.) of the specific user. The association ties the encryption process to the biometric data of the user such as a fingerprint or retinal scan, thereby providing a personalized and highly secure means of protecting the private key. The biometric characteristic ensures that only the authorized user, possessing the specific biometric trait, can utilize the private key for decryption, thereby preventing unauthorized access to the encrypted data. During the creation of the private key, fingerprint data of user is used to generate unique identifier. When the user later wants to decrypt the data, the system requires the same fingerprint to be provided. The fingerprint is scanned, and if it matches the one used to generate the unique identifier, the system allows the private key to be used for decryption.

In still another embodiment, the method comprises periodically updating the geometric properties. The periodic update involves recalculating parameters such as the major radius R, the minor radius r and the integers p and q, as discussed in reference to FIG. 3. Further, regularly updating the geometric properties ensures that the torus knots remain complex and unique over time, enhancing the long-term security of the encryption process by preventing the reuse of the same geometric configuration. Dynamic adjustment of the torus knot's properties adds an ongoing layer of protection against evolving threats and computational advances.

Figure 5:
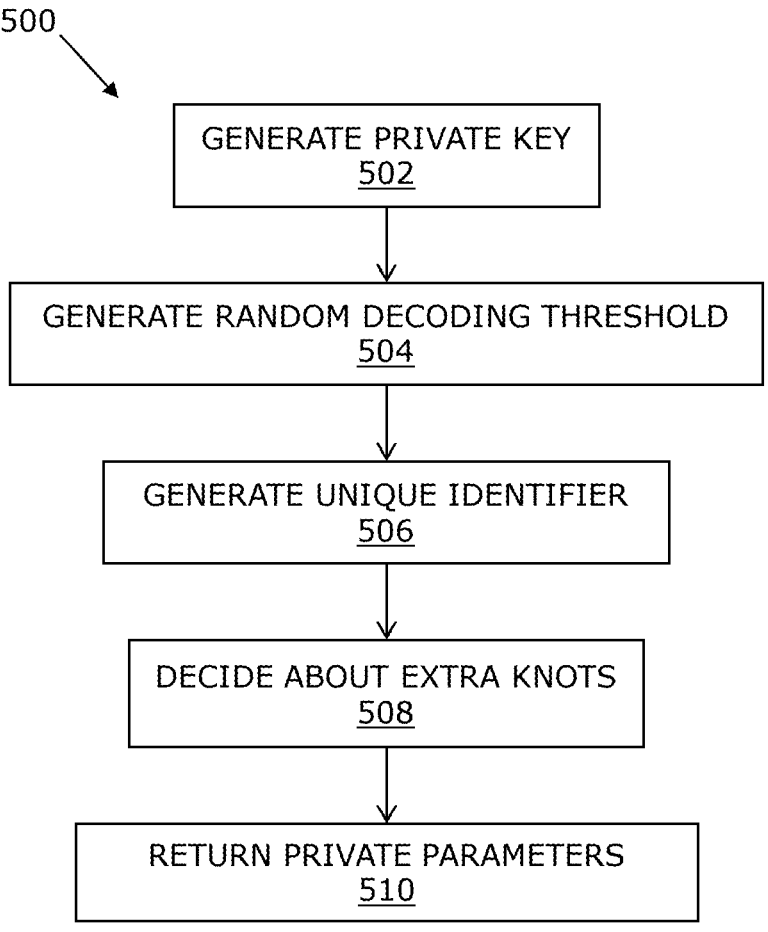
FIG. 5 shows a flowchart illustrating the generation of private parameters, in accordance with an embodiment of the present disclosure.

Referring now to FIG. 5, a flowchart 500 illustrates the generation of private parameters, in accordance with an embodiment of the present disclosure. The flowchart 500 ensures that the private parameters are generated with a higher degree of security and specificity, customized to the individual user or session and improved using specific elements to protect against unauthorized access. At step 502, the method generates the private key used for the encryption and decryption processes. The private key incorporates specific elements that enable the accurate decoding of encrypted information. The generation of the private key is conducted in a manner that ensures its uniqueness and security, preventing unauthorized access to the encrypted data.

At step 504, the method generates the random decoding threshold. The random decoding threshold of the private key determines the precise point at which the encoded torus knots can be decoded back into the original binary data. The randomness of the decoding threshold enhances the security of the decryption process by introducing an element of unpredictability, thereby making it more challenging for unauthorized entities to reverse-engineer or bypass the encryption.

At step 506, the method generates the unique identifier that ties the encryption process to a particular individual or context, adding a personalized layer of security. The unique identifier can be linked to a biometric characteristic of the user, as discussed in an earlier embodiment, further enhancing security by ensuring that only the authorized user can access the encrypted data.

At step 508, the method makes a decision regarding extra knots. The decision to include extra knots or noise knots, as discussed in reference to FIG. 1 and FIG. 4, impacts the overall complexity and security of the encrypted data. The inclusion of the extra knots provides additional layers of obfuscation, making it more difficult for unauthorized entities to decipher the true data structure.

At step 510, the method finalizes and returns the private parameters. The step 510 involves finalizing the private key and its associated components, including the random decoding threshold, the unique identifier and any extra knots that may have been included. The private parameters are then ready to be utilized in the encryption and decryption processes, providing a secure foundation for handling sensitive data.

Figure 6:
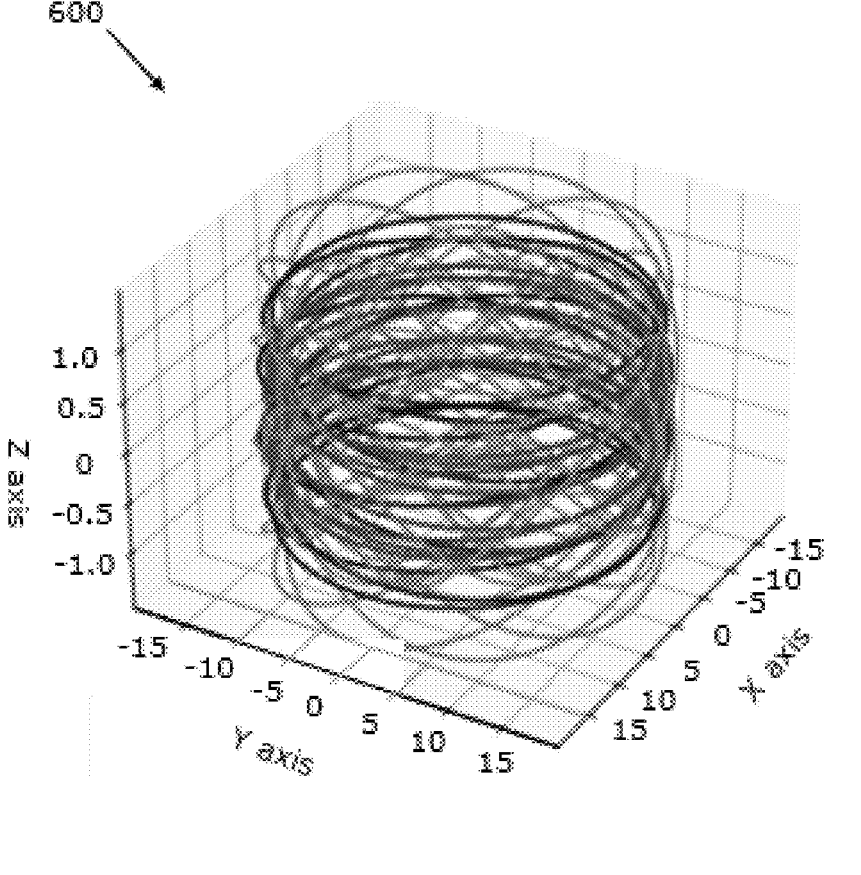
FIG. 6 shows an exemplary three-dimensional representation of encoded torus knots with noise, in accordance with an embodiment of the present disclosure.

Referring to FIG. 6, there is shown an exemplary three-dimensional representation 600 of encoded torus knots with noise, in accordance with an embodiment of the present disclosure. In this figure, the torus knots are plotted in a three-dimensional space defined by the X, Y, and Z axes. Each torus knot corresponds to specific encoded bits within the data stream. The knots are colored differently to distinguish between the encoding of different bit values and the added noise. The lighter gray lines represent the torus knots that encode a bit value of 0. The darker gray lines represent the torus knots that encode a bit value of 1. The medium gray lines depict the noise knots, which are randomly generated and interspersed with the data-carrying knots.

Figure 7:
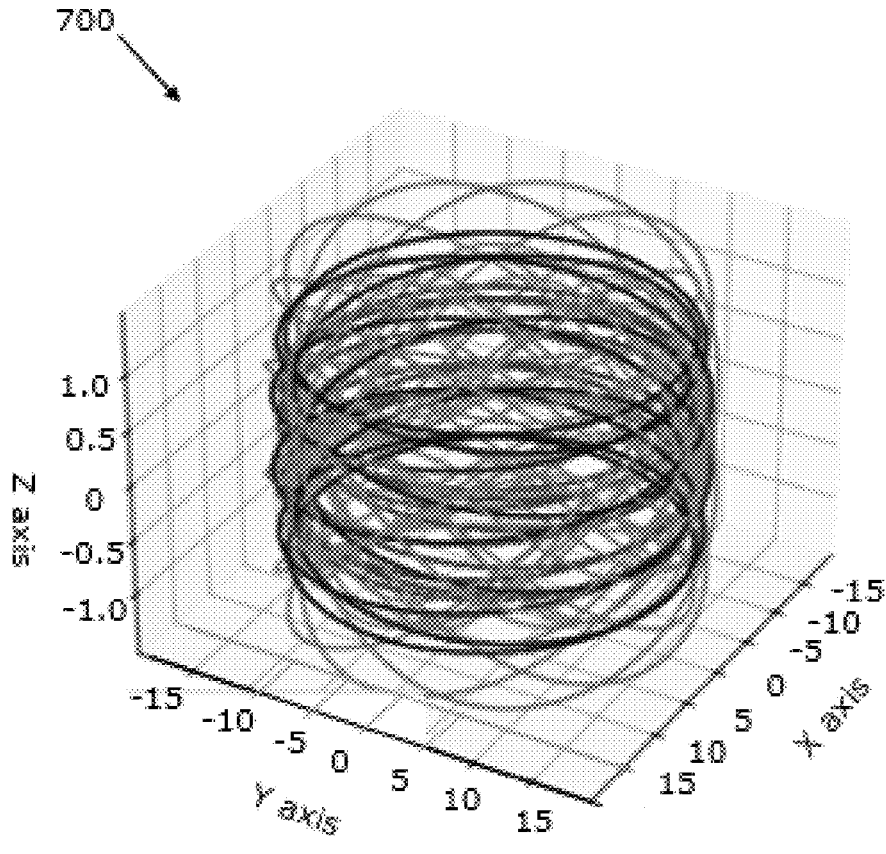
FIG. 7 shows an exemplary three-dimensional representation of shuffled torus knots, in accordance with an embodiment of the present disclosure.
Figure 7:
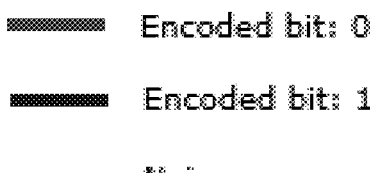

Referring to FIG. 7, there is shown an exemplary three-dimensional representation 700 of shuffled torus knots, in accordance with an embodiment of the present disclosure. The torus knots are depicted in different shades in gray color to indicate the shuffling of encoded bits and noise within the data stream. The image illustrates how the torus knots, representing different bit values, are mixed and reordered as part of the encryption process. The lighter gray lines correspond to torus knots that represent encoded bits with a value of 0. The darker gray lines represent torus knots that encode a bit value of 1. The medium gray lines illustrate the noise knots, which are also shuffled among the data-carrying knots. FIG. 7 visually demonstrates how the shuffling process rearranges the torus knots and noise within the encrypted data stream to obscure the original order of the data, making challenging for unauthorized entities to decrypt or analyze the information without the correct keys and algorithms.

In an embodiment, the method for encrypting data stream can be integrated with torus knot post quantum encryption algorithm (torus knot-PQEA) with artificial intelligence (AI) driven key management platform. Such integration enables development of a quantum security platform that can utilize technological advancement and advantages of post-quantum cryptography, resistant to decryption by quantum computers. The torus knot-PQEA encodes data into complex geometric structures for secure encryption that withstands quantum attacks. Further, the torus knot-PQEA can be associated with AI-driven key management tool to automate various key generation steps (e.g., generation, distribution, revocation, reassignment, and rotation), thereby automatically mitigate human error and enhance security. The AI-driven key management platform continuously determines and manages threats in real-time. By combining AI-driven key management and torus knot-PQEA, the present disclosure safeguards sensitive data from cybersecurity challenges and quantum hackers.

In an embodiment, the torus knot-PQEA provides robust data encryption to safeguard sensitive data from quantum attacks. The torus knot-PQEA utilizes complex geometric properties of torus knots to encode data streams securely. The torus knot-PQEA generates a public key based on various geometric properties of torus knot, and private key with a unique decoding threshold and identifier. Further, a session key is generated based on public and private keys, whereas the session key can be used for encryption of data stream. Additionally, the torus knot-PQEA may introduce noise knots to augment complexity of encryption to provide protection against decryption attempts. The torus knot-PQEA enables protection against hackers with advanced computational capabilities of quantum computers. Thus, torus knot-PQEA can secure sensitive data against both threats and challenges posed by quantum computing, therefore maintaining data confidentiality and integrity. The integration of AI into the quantum security platform enhances protection against vulnerabilities and breaches. AI can continuously monitor and analyze vast amounts of data to detect unusual patterns or activities, which may indicate quantum attacks or other cyber threats. The capability of AI to recognize patterns improves security aspect of torus knot-PQEA against threats. By identifying these threats in real-time, the AI enables the torus knot-PQEA to respond in real time.

Additionally, the AI component of torus knot-PQEA undergoes a continuous learning process to improve detection capabilities and strengthen security aspect. Furthermore, AI-driven automation of key management processes improves efficiency of security aspect of quantum security platform. Further, the platform utilizes AI technique to automate generation, distribution, rotation, and revocation of cryptographic keys to reduce/eliminate human intervention and secure management of cryptographic keys throughout lifecycle to reduce risk of exposure of key. For instance, AI can automatically generate new keys based on specific criteria, distribute generated keys to the necessary parties, and rotate at regular intervals to maintain security.

Additionally, AI can revoke compromised keys such that compromised keys are no longer valid. Further disclosed is a non-transitory computer-readable storage medium, comprising executable instructions that, when executed by a processing system including a processor, perform a method of encrypting a data stream. The method comprises encoding the data stream into one or more torus knots and generating a public key and a private key. The public key is generated from the geometric properties associated with the one or more torus knots and the private key comprises a unique decoding threshold and a unique identifier associated with a specific user or session. The method further comprises combining the public key and the private key to generate a session key and generating one or more noise knots. Each noise knot is randomly generated and interspersed with the torus knots. Moreover, the method comprises employing a shuffling process to reorder the torus knots and the noise knots based on the session key to encrypt the data stream and generate an encrypted data stream.

In an aspect, any or a combination of machine learning mechanisms such as decision tree learning, Bayesian network, deep learning, random forest, supervised vector machines, reinforcement learning, prediction models, Statistical Algorithms, Classification, Logistic Regression, Support Vector Machines, Linear Discriminant Analysis, K-Nearest Neighbors, Decision Trees, Random Forests, Regression, Linear Regression, Support Vector Regression, Logistic Regression, Ridge Regression, Partial Least-Squares Regression, Non-Linear Regression, Clustering, Hierarchical Clustering—Agglomerative, Hierarchical Clustering—Divisive, K-Means Clustering, K-Nearest Neighbours Clustering, EM (Expectation Maximization) Clustering, Principal Components Analysis Clustering (PCA), Dimensionality Reduction, Non-Negative Matrix Factorization (NMF), Kernel PCA, Linear Discriminant Analysis (LDA), Generalized Discriminant Analysis (kernel trick again), Ensemble Algorithms, Deep Learning, Reinforcement Learning, AutoML (Bonus) and the like can be employed to learn sensor/hardware components.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

The invention claimed is:

1. A method for encrypting a data stream, wherein the method comprises:

encoding the data stream into one or more torus knots;

generating a public key and a private key, wherein:

the public key is generated from the geometric properties associated with the one or more torus knots; and the private key comprises a unique decoding threshold, and a unique identifier associated with a specific user or a session;

combining the public key and the private key to generate a session key;

generating one or more noise knots, wherein each noise knot is randomly generated and interspersed with the torus knots; and employing a shuffling process to reorder the torus knots and the noise knots based on the session key to encrypt the data stream to generate an encrypted data stream.

2. The method of claim 1, further comprising performing, a decoding process for unshuffling the torus knots and the noise knots of the encrypted data stream to retrieve the data stream, using the private key.

3. The method of claim 1, wherein the specific geometric parameters associated with the plurality of torus knots comprise:

a major radius (R) that defines a distance from a center of the torus to a circular path associated with the torus; and two positive integers (p, q), wherein each of the positive integers (p, q) are coprime.

4. The method of claim 1, wherein resolution of each torus knot is determined by a number of points which represent the knot.

5. The method of claim 3, wherein the positive integers p and q, and the number of points are employed to create the evenly spaced arrays to define the torus knot.

6. The method of claim 3, further comprising computing, a combination of rotations and translations for each point in the sequence based on the major radius (R), the minor radius (r) and the two coprime integers (p, q) to determine the three-dimensional coordinates for each point on the torus knot to define the geometric properties.

7. The method of claim 1, further comprising:

segmenting the received data stream into a sequence of initial bits;

modifying the initial bits using a bitwise exclusive OR (XOR) operation with the session key to adjust the bits; and encoding the adjusted bits into the torus knots.

8. The method of claim 1, further comprising:

generating a shuffle key by utilizing the session key and the additional parameters, wherein the shuffle key is generated for each encryption session; and computing the shuffle indices from the shuffle key to reorder the torus knots to produce a shuffled arrangement of the torus knots to encrypt the data stream.

9. The method of claim 8, further comprising unshuffling, the torus knots, using the session key, to an initial arrangement to facilitate decryption of the encrypted data stream.

10. The method of claim 1, wherein the unique decoding threshold is generated randomly.

11. The method of claim 1, further comprising adjusting, a density of point of each torus knot based on a perceived threat level or a computational capability.

12. The method of claim 1, wherein the encoding process further comprises employing, a machine learning technique to optimize configuration of the torus knots based on at least one parameter selected from:

a nature of the data stream;

a sensitivity level of the data stream;

a data stream size;

a historical data breach information; and the network parameters.

13. The method of claim 1, wherein the session key is valid only for a predefined time period.

14. The method of claim 1, wherein the unique identifier of the private key is associated with a biometric characteristic of the specific user.

15. The method of claim 1, wherein the geometric properties are updated periodically.

16. The method of claim 1, wherein encryption of the data stream utilizes a torus knot post quantum encryption algorithm (torus knot-PQEA) with artificial intelligence (AI) driven key management platform, wherein the torus knot-PQEA is associated with a AI-driven key management tool to automate the key generation steps to automatically mitigate a human error and enhance security, wherein the key generation steps are generation, distribution, revocation, reassignment, and rotation.

17. A non-transitory computer-readable storage medium, comprising executable instructions that, when executed by a processing system including a processor, perform a method of encrypting a data stream, the method comprising:

encoding the data stream into one or more torus knots;

generating a public key and a private key, wherein:

the public key is generated from the geometric properties associated with the one or more torus knots; and the private key comprises a unique decoding threshold, and a unique identifier associated with a specific user or a session;

combining the public key and the private key to generate a session key;

generating one or more noise knots, wherein each noise knot is randomly generated and interspersed with the torus knots; and employing a shuffling process to reorder the torus knots and the noise knots based on the session key to encrypt the data stream to generate an encrypted data stream.

* * * * *